United States Patent [19]

Delory

[11] Patent Number: 5,452,450
[45] Date of Patent: Sep. 19, 1995

[54] SYSTEM OF GLOBAL UPDATE FOR TIME/LANGUAGE HETEROGENEOUS DATABASES USING A RELATIONAL REFERENCE DATABASE AND BOTH REQUEST AND DATABASE IDENTIFIER FILES

[75] Inventor: Jean-Michel Delory, Levis St. Nom, France

[73] Assignee: Alcatel Cit, Paris, France

[21] Appl. No.: 170,979

[22] Filed: Dec. 21, 1993

Related U.S. Application Data

[63] Continuation of Ser. No. 705,409, May 24, 1991, abandoned.

[30] Foreign Application Priority Data

May 29, 1990 [FR] France ............................... 90 06651

[51] Int. Cl.⁶ ............................................. G06F 17/30
[52] U.S. Cl. ............................. 395/600; 364/DIG. 1; 364/282.1; 364/282.4; 364/283.4; 364/285
[58] Field of Search ............................... 395/600, 650; 364/419.01

[56] References Cited

U.S. PATENT DOCUMENTS

| | | | |
|---|---|---|---|
| 4,186,438 | 1/1980 | Bensen et al. | 364/200 |
| 4,466,098 | 8/1984 | Southard | 371/9.1 |
| 4,714,995 | 12/1987 | Materna et al. | 395/600 |
| 4,745,559 | 5/1988 | Willis et al. | 364/514 |
| 4,769,772 | 9/1988 | Dwyer | 395/600 |
| 4,835,685 | 5/1989 | Kun | 364/200 |
| 4,887,204 | 12/1989 | Johnson et al. | 364/200 |
| 4,914,570 | 4/1990 | Peacock | 364/200 |
| 4,918,593 | 4/1990 | Huber | 364/200 |
| 4,925,311 | 5/1990 | Neches et al. | 364/200 |
| 5,058,000 | 10/1991 | Cox et al. | 395/600 |
| 5,257,366 | 10/1993 | Adair et al. | 395/600 |
| 5,278,978 | 1/1994 | Demers et al. | 395/600 |
| 5,307,265 | 4/1994 | Winans | 364/419.01 |

FOREIGN PATENT DOCUMENTS 2201270  8/1988  United Kingdom ......... G06F 11/30

OTHER PUBLICATIONS

Hewlett-Packard Journal, vol. 37, No. 12, Dec. 1986, pp. 33–48, Palo Alto, Calif. USA; A. S. Brown et al.: "Data base management for HP precision architecture computers".

*Primary Examiner*—Thomas G. Black
*Assistant Examiner*—Wayne Amsbury
*Attorney, Agent, or Firm*—Sughrue, Mion, Zinn, Macpeak & Seas

[57] ABSTRACT

A database network management method ensures consistency of modifications to data in a network of databases comprising a relational database which constitutes a reference database and at least one further database accessible in real time. The data of the relational database is duplicated at least in part in the further databases accessible in real time. To enable an application process to modify data in all of the database network, the method is as follows: (1) A data modification request in the SQL language is sent from the application process to a pool of server processes of a relational database management system, (2) a server process is assigned to the request for the duration of its processing, (3) the modification request in the dynamic SQL language is sent from the server process pool to a relational database management system and the request is executed, (4) the further databases in accessible in real time to which the modification request relates are determined, (5) the request is transferred to the further databases in a form compatible with a management system of each further database concerned, and (6) the modification request is executed in each further database concerned.

3 Claims, 4 Drawing Sheets

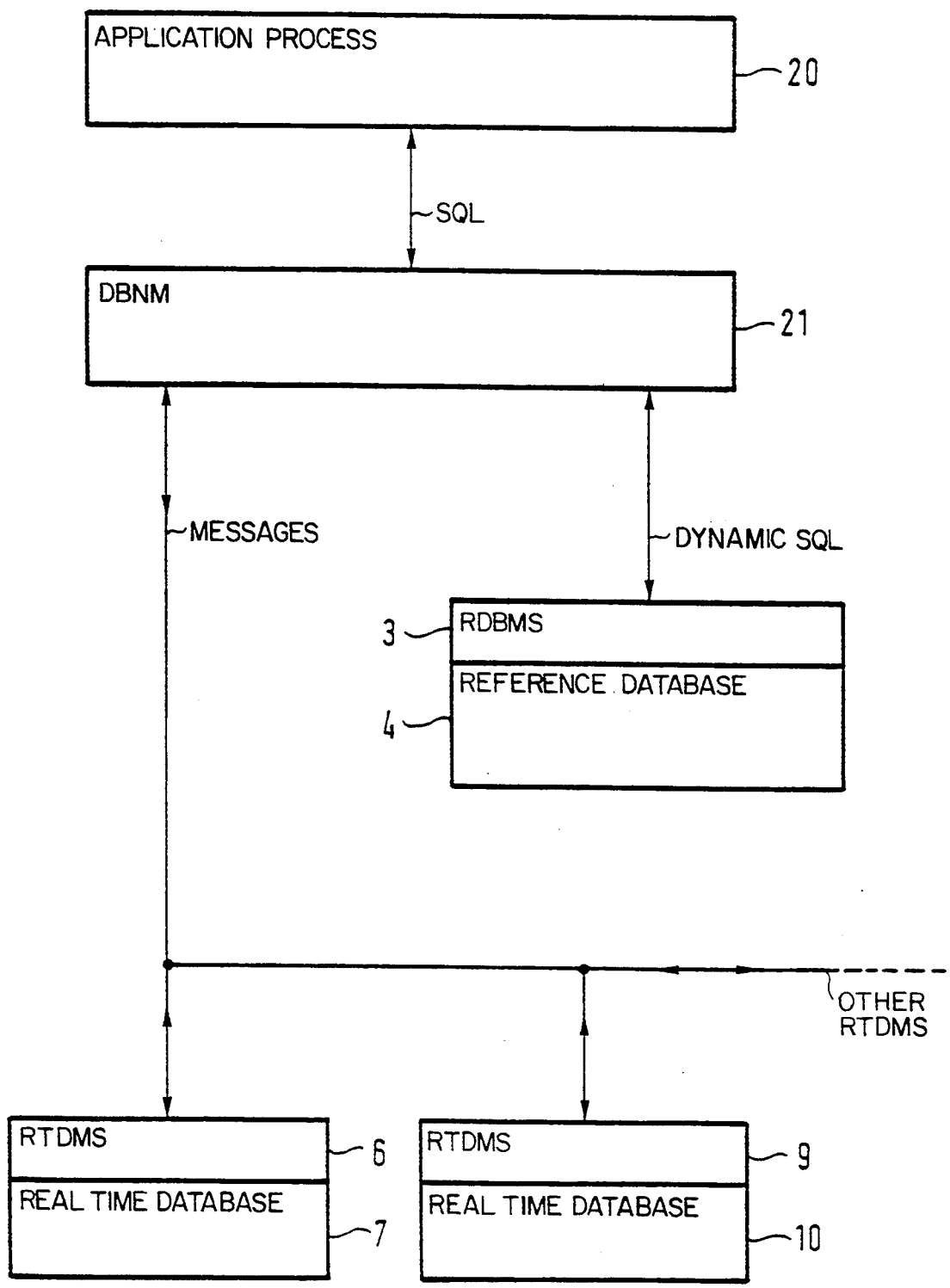

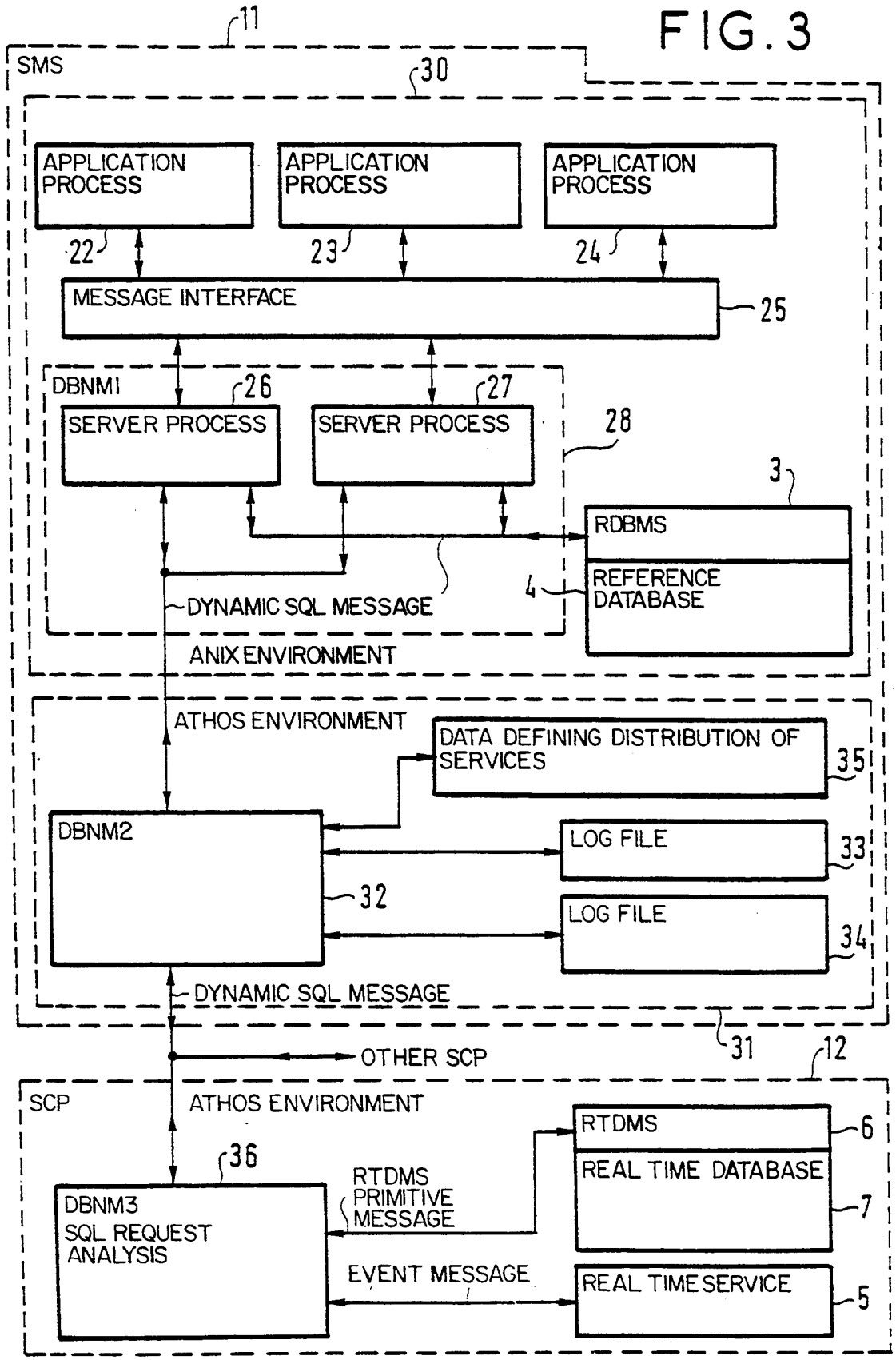

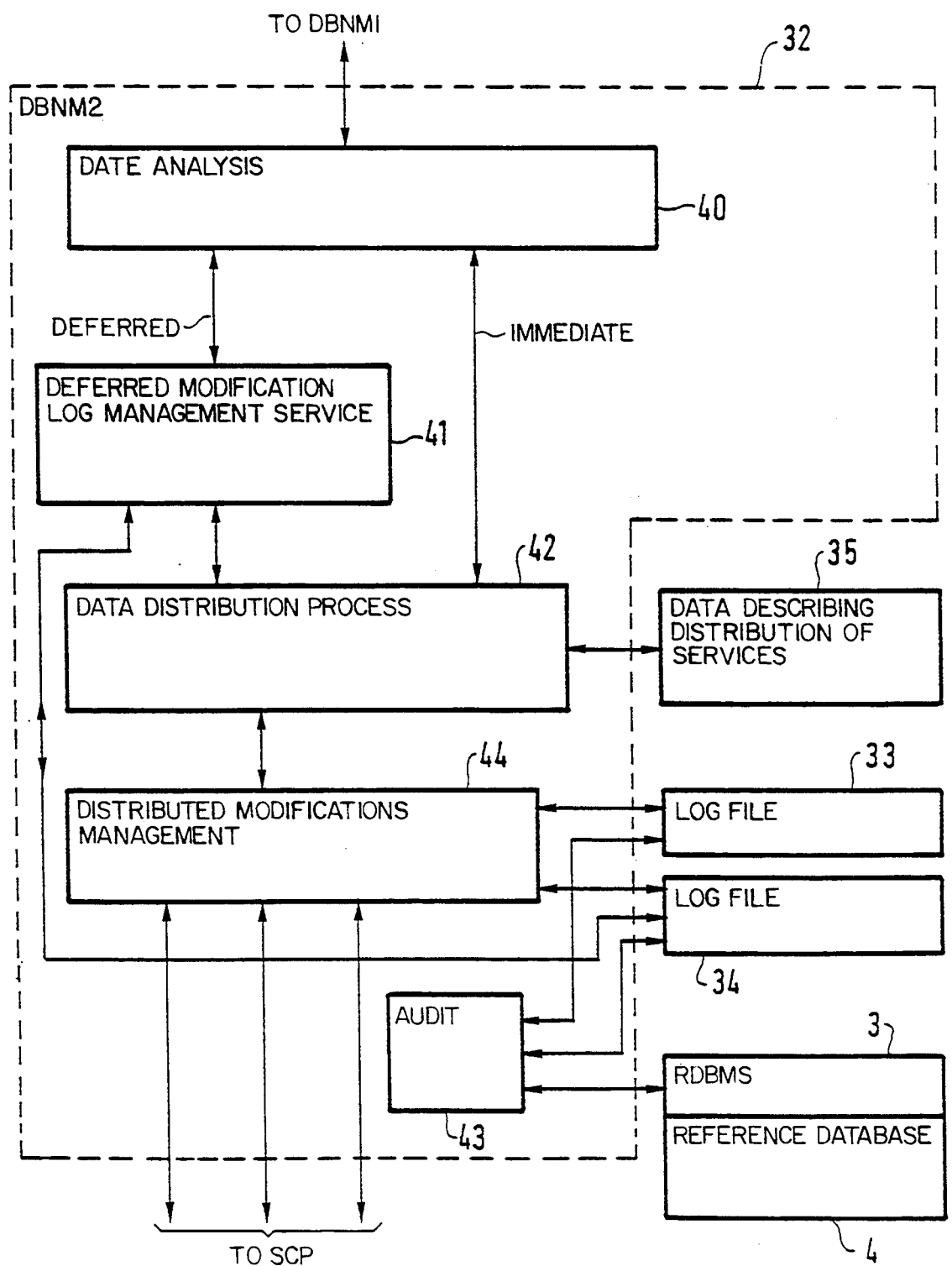

SYSTEM OF GLOBAL UPDATE FOR TIME/LANGUAGE HETEROGENEOUS DATABASES USING A RELATIONAL REFERENCE DATABASE AND BOTH REQUEST AND DATABASE IDENTIFIER FILES

This is a continuation of application Ser. No. 07/705,409 filed May 24, 1991, now abandoned.

BACKGROUND OF THE INVENTION

1. Field of the Invention

The invention concerns a method of managing a network of databases to maintain the consistency of the data in the various data bases on the network.

2. Description of the Prior Art

A network of databases is used in an intelligent communication network. An intelligent communication network can easily offer new services to users thanks to a specific architecture comprising switching centers and dedicated machines. These dedicated machines control the services provided via the network. New services are introduced by modifying the software and the data of these dedicated machines. The network switching centers are not affected. This facilitates the introduction of new services.

The dedicated machines comprise:
   a service management system (SMS) which is the center of the network in terms of data management; and
   service control points (SCP) which are the nodes at which the data is used to provide services.

Calls using the services of the intelligent network are routed to dedicated switching centers called service switching points which interrogate a service control point to provide the required services. For example, a service switching point can interrogate a service control point to obtain the translation of a freephone number (i.e., an "800" number) into a directory number.

The principal parties operating on the data managed by the intelligent telecommunication network are:
   the provider of a service, who manages the data resulting from agreements entered into with the service subscribers;
   the subscribers to a service; for example, freephone subscribers can modify some service data such as the times at which calls are forwarded;
   the users of a service, who use the service data; for example, when users call a freephone number, the service data is used to translate the number called into a directory number.

In one known type of intelligent network the services data is stored and managed in:
   a relational database situated in the service management system and managed by a relational database management system (RDBMS); the data in this base is manipulated by the subscription management programs, under the control of the service provider, and by the subscriber access management programs, under the control of the subscribers; and
   databases accessible in real time, located in the respective service control points and each managed by a real time data management system RTDMS; these databases are accessible in real time for manipulation by programs which provide the services offered by the service control point, for example to translate a freephone number into a directory number.

The relational database in the service management system is a reference database. The data constituting the databases of the service control points consist of data from the service management system database which is either duplicated in or distributed to the various service control points. There are three ways it can be divided between the databases:
   a table of the reference database is copied only into the database of a single service control point if the service to which it relates is provided at only one service control point;
   a table of the reference database is copied into the databases of several service control points if the service to which it relates is provided on a traffic sharing basis by a number of service control points, in which case the table is said to be "duplicated"; and
   a table of the reference database is partially copied into the databases of more than one service control point if the service to which it relates is provided on a resource sharing basis by these service control points, in which case the table is said to be "distributed".

Data management is provided by:
   a relational database management system (RDBMS) located only in the service management system; and
   a real time data management system (RTDMS) located in the service management system and in each service control point.

The two data management systems define data in the same way. The term "table" refers to data structures managed by these management systems. The RDBMS and the RTDMS can therefore share a common logical data model, although the systems have different physical organizations and different data manipulation languages. The RDBMS uses SQL (Structured Query Language) standardized by the American National Standards Institute. The RTDMS uses a set of real-time oriented primitives. From the data management point of view, an intelligent telecommunication network is therefore a heterogeneous network of databases. The complexity of implementation of application processes operating on the data depends on the characteristics of the database network manager. This implementation can be complex if the manager allows the application processes to see the heterogeneous nature of the network.

The distribution of data between a number of separate databases means that a database network manager (DBNM) is required which implements a data management process guaranteeing the consistency of data when application processes such as subscription management programs used by the service provider generate requests to modify data. The complexity of implementation of application processes operating on the data depends on the characteristics of the database network manager. This implementation can be complex if the manager allows the application processes to see the heterogeneous nature of the network.

A first object of the invention is to propose a management process which masks from application processes the multiplicity of data management systems and the differences between data manipulation languages, allowing application processes to modify the data in all the databases using a single type of request.

SUMMARY OF THE INVENTION

The invention consists in a method of managing a network of databases comprising a relational database which constitutes a reference database and at least one database accessible in real time, the data of the relational database being duplicated at least in part in the databases accessible in real time;

characterized in that to enable an application process to modify data in all of the database network, the method consists of:

- sending a data modification request in the SQL language from the application process to a pool of server processes of a relational database management system;
- assigning a server process to said request for the duration of its processing;
- sending the modification request in the dynamic SQL language from the server process pool to a relational database management system and executing said request;
- determining the databases accessible in real time to which the modification request relates;
- transferring said request to them in a form compatible with a management system of each database concerned; and
- executing the modification request in each database concerned.

This method means that the application processes see only a single database, the relational database, using a single type of request in the SQL language.

A second object of the invention is to propose a process which also allows application processes to request deferred execution of modifications to data in the databases accessible in real time. In the case of freephone service, for example, it is desirable for the introduction of a number to coincide with the setting up of a group of operators or with the launch of an advertising campaign. The date for updating the copy of the service operational data in a service control point is therefore a parameter which must be defined under the control of the application process.

A third object of the invention is to propose a management process further providing for a modification request to be executed in all of the database network despite any possible unavailability of one or more links to service control points, given that the projected unavailability of intelligent network nodes and links complies with specific telephone standards.

A fourth object of the invention is to propose a management process further providing for verifying the consistency of data throughout the network, in order to detect problems due to incorrect execution of a modification request, for example.

The invention will be better understood and further details of the invention will emerge from the following description and the accompanying figures:

BRIEF DESCRIPTION OF THE DRAWINGS

FIG. 2 shows a functional block diagram of the network, which includes a database network manager, for implementing the method in accordance with the invention.

FIG. 3 shows a more detailed functional block diagram of the manager and its subdivision between the service control points in the intelligent network.

FIG. 4 shows a detailed functional block diagram of part of the manager.

DETAILED DESCRIPTION OF THE INVENTION

Figure 1:
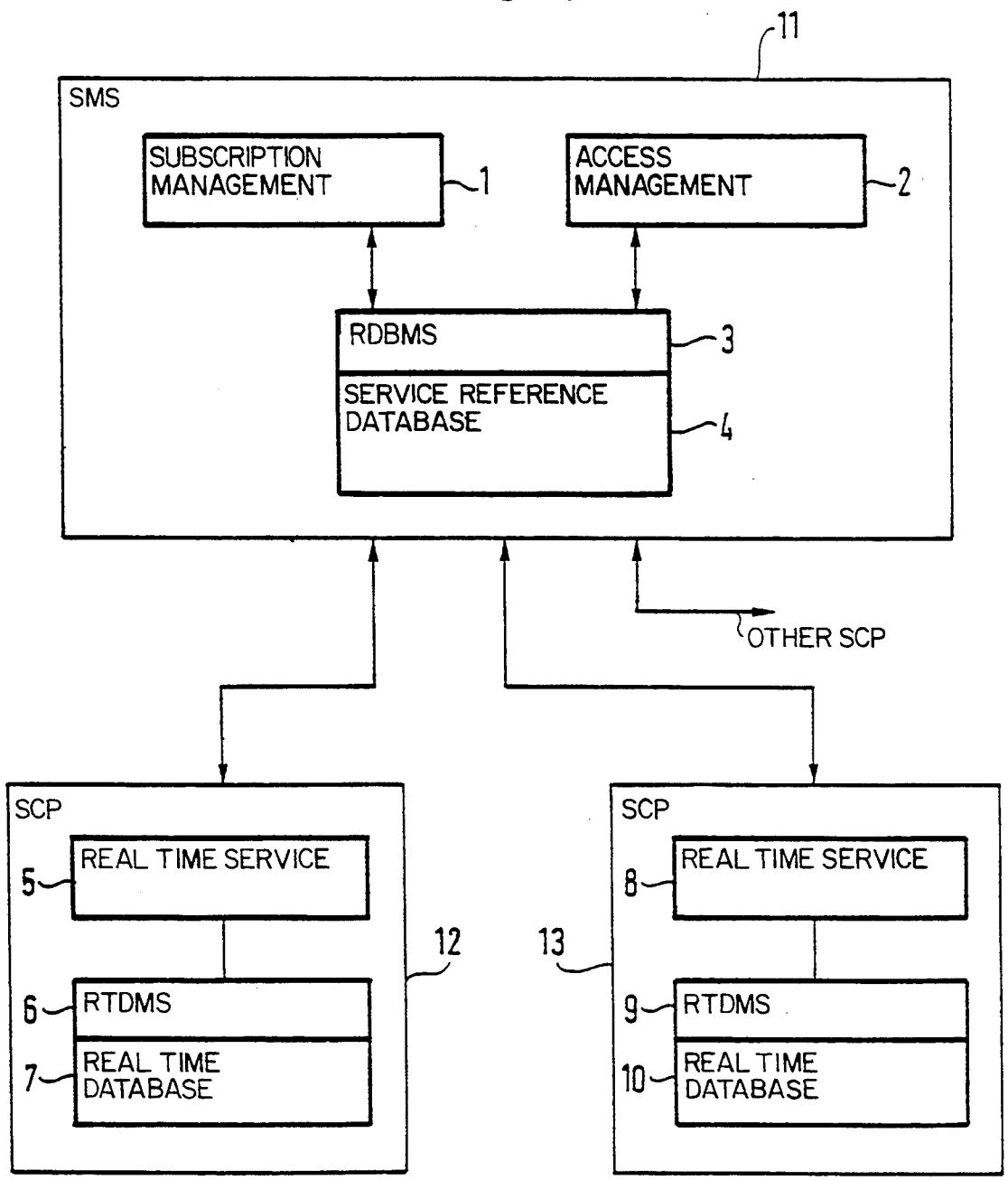
FIG. 1 shows a block diagram of one example of an intelligent telecommunication network.

The intelligent telecommunication network shown by way of example in FIG. 1 comprises: a service management system 11 and a plurality of service control points 12, 13, etc. connected to the service management system 11 by CCITT No 7 links.

The service management system 11 handles: application processes, in particular subscription management programs 1 and access management programs 2, a relational database management system 3; and a relational database 4 which constitutes a reference database for each service. The service control point 12 implements application processes 5 consisting of programs providing real time services; a real time database management system 6; and a database 7 accessible in real time. The other service control points are similar to the service control point 12. The service control point 13 implements: application processes 8 in the form of programs providing real time services; a real time database management system 9 and a database 10 accessible in real time.

FIG. 2 shows a functional block diagram of the same network except that a database network manager 21 has been introduced to implement the method in accordance with the invention. An application process 20 sends to the database network manager 21 a data modification request in the form of a string of characters in the SQL language. The database network manager 21 then sends a similar request to the relational database management system 3 associated with the reference database 4 using a dynamic SQL interface of the relational database management system enabling execution of a request contained in a string of SQL characters. When the modification has been carried out in the reference database 4, the database network manager 21 determines a list of databases 7, 10, etc. accessible in real time to which the modification relates. It then sends messages transferring the same data modification request to the real time database management systems 6, 9, etc. associated with the respective databases 7, 10, etc. concerned. Each character string embodying a request is analyzed by the database network manager 21 to determine: the request type, the name of the table to be modified, the names of the columns of the table to be modified and the values from these columns. The request is put into the form of real time database management system primitives. The database network manager 21 can transmit, with the data modification, an event for triggering an action of a real time service program, in relation to and synchronized with the execution of the data modification.

FIG. 3 shows a functional block diagram of this intelligent network showing the functional architecture of the database network manager 21 in more detail. To clarify the diagram only the service control point 12 is shown. The service management system 11 is a hybrid machine with two operating systems:

- the ANIX operating system, an implementation of the UNIX operating system, marketed by the American company ATT BELL LABORATORIES, on an Alcatel 8300 machine marketed by the French company Alcatel CIT;

the ATHOS operating system, a real time operating system designed for call processing and marketed by ALCATEL CIT.

The database network manager 21 comprises three database network manager modules DBNM1 and DBNM2 and DBNM3 identified by the respective reference numbers 28, 32, 36. The first and second modules are implemented in the service management system 11, in an ANIX environment 30 and in an ATHOS environment 31, respectively. The third module is implemented in each of the service control points including the service control point 12, in an ATHOS environment.

The relational database management system 3 associated with the reference database 4 in the service management system 11 is executed in the ANIX environment. The real time database management systems 6, etc are executed in the ATHOS environment. The service control points 12, etc are real time machines running only the ATHOS operating system. The DBNM1 module is a pool of ANIX server processes 26 and 27. They implement access to the relational database management system 3 requested by application processes 22 to 24. The server processes 26 and 27 communicate with the application processes 20 to 24 via a message interface 25. The messages supplied by the application processes 22 to 24 are in the SQL language. The server processes 26 to 28 retransmit these messages to the relational database management system 3 in the dynamic SQL form and generate other messages to the real time database management systems 6, etc. These messages are made up of real time database management system primitives including modifications to be carried out in the database 7 of the service control point 12, etc. These messages pass through the DBNM2 module 32 which executes in the ATHOS environment.

The server processes 26 and 27 and the application processes 22 to 24 use ANIX operating system calls to exchange messages through two queues of the message interface 25. To access data of the reference database 4 an application process (22, for example) places in a first queue a message containing its access request and then waits for a response in a second queue.

The server processes which are free wait for requests in the first queue. They put their responses into the second queue.

A request may be an instruction to select lines in a table or a transaction. The term "transaction" refers to a series of operations, essentially data modifications, which are executed in the relational database 4 through its relational database management system 3. The following management operations apply to a transaction:
opening;
execution of the series of modifications constituting the transaction;
aborting the series of data modifications in response to an incident.

Each server process 26 and 27 can process a request from any application process. However, if a request requires several exchanges of messages, a particular server process is assigned to the application process which made the request throughout the processing of the request so that this processing is coherent. This assignment is carried out in the following cases:
When an application process sends an instruction to select lines of a table and the response requires multiple response messages. The message interface 25 does not impose on the application process a number of lines that a select instruction can select in a table. An instruction can therefore select a number of lines requiring several response messages. The message size is a system configuration parameter. It is not certain that a single response message is sufficient to contain all the read data, whatever the select instruction may have been. The server process therefore determines if one message is sufficient to transfer the lines selected. If more than one message is needed, it advises the process accordingly in a response message and then waits for a request invoking the subsequent response messages. A particular server process is therefore slaved to the application process which sent the select instruction. The application process can request the remainder of the response when it needs it.

If an application process opens a transaction. Each transaction comprises a number of messages. These messages must be processed by the same server process to ensure consistency.

In both cases the assignment of a server process to a particular application process is achieved by exchanging in the messages the identity of the application process and the identity of the server process.

The content of the messages exchanged through the two queues of the message interface 25 will now be described.

A message addressed by an application process to a server process for a line select instruction contains:
a message type, containing a conventional value to indicate that no specific server process is designated;
an operation code which indicates that this is a select instruction;
the identity of the application process;
a select instruction in the form of a string of characters including a key in which all the columns have a value.

A message sent by an application process to a server process to request the remainder of a response contains:
a message type which contains the identity of the assigned server process, in other words the server process which began to process the request and is therefore designated to continue it;
an operation code which indicates that this is a request for the remainder of a response;
a reference designating the operation, created by the server process.

The message sent by an application process to a server process to request the opening of a transaction contains:
a message type which contains a conventional value to indicate that no particular server process is designated;
an operation code which indicates that this is a transaction opening request;
the identity of the application process;
the date at which the modifications constituting the transaction must be done in the service control points;
where appropriate, the designation of an event for triggering an action of a real time service program, this action having to be synchronized with data modifications in the service control point.

A message sent by an application process to a server process for a transaction instruction contains:
a message type which contains the identity of the assigned server process;

an operation code which indicates that this is a transaction in progress or the end of a transaction;

the identity of the application process;

a reference designating the transaction, created by the server process;

an instruction in the dynamic SQL language and in the form of a string of characters comprising an access key in which all columns have a value.

A message sent by a server process to an application process to respond to a select instruction contains:

a message type which contains the identity of the application process;

an operation code which indicates that this is a single response or a response made up of multiple response messages;

the identity of the server process and the reference of the operation, if there is more than one response message;

the reference of the transaction if the instruction is included in a transaction;

data read from a database.

A message sent by a server process to an application process to respond to a modify instruction contains:

a message type which contains the identity of the application process;

an operation code which indicates the type of operation and if it was executed correctly or not;

the identity of the server process;

the reference of the transaction.

A message sent by a server process to an application process to respond to a transaction management instruction contains:

a message type which contains the identity of the application process;

an operation code which indicates the type of operation concerned and whether it was executed correctly or not;

the identity of the server process;

the reference of the transaction.

The server processes 26 and 27 of the DBNM1 module 28 and the application processes 22 to 24 execute the processes now to be described. The three server processes are queued in the first queue of the method interface 25. An application process requests access to the data by placing a message in the first queue; it then waits for a response in the second queue, calling the ANIX operating system in a mode which blocks execution of this application process until a response message is received containing a message type containing the identity of this application process.

When a server process 26 or 27 receives an instruction to select lines of data in a table the instruction is in the form of a string of SQL characters. The server process converts the instruction into the form of a string of dynamic SQL characters and adds a descriptor to it before sending it to the relational database management system 3. The latter supplies it with lines of data read from the reference base 4. The server process transfers the read data to the application process in a response message using formats provided in the descriptor. If more than one message is needed the server process indicates this in its response and waits in the first queue for a request to continue sent by the application process.

When a server process 26 or 27 receives a request to open a transaction it creates an internal reference for the transaction. In a context associated with the transaction it indicates: the date fixed for the actual execution of the modifications and, where appropriate, an event for triggering an action. It sends back to the application process an acceptance message and waits in the first queue.

When a server process 26 or 27 receives a data modification instruction it checks the reference of the transaction and then transmits the modify instruction to the relational database management system 3. If the instruction is executed without error the server process stores this information in the context of the transaction and then sends an end of instruction message to the application process. It then waits in the first queue.

When a server process 26 or 27 receives an end of transaction instruction, in other words an instruction to abort a data modification or an instruction to execute a data modification, it checks the context reference and transmits the order to the relational database management system 3. If the instruction is an execute instruction and if it is executed without error the server process sends to the DBNM2 module an update message containing all the modify instructions to which the transaction relates. If the instruction is an instruction to abort the modifications to which the transaction relates the server process does not send the update message to the DBNM2 module.

Finally, it sends an end of instruction message to the application process and waits for a further request in the first queue.

The DBNM2 module 32 is associated with a log file 33 and a deferred modifications log file 34 and with data 35 describing the subdivision of services within the service control points. The functions of the files 33 and 34 and the data 35 will be described later.

The DBNM2 module is responsible for determining to which service control points each data modification request applies and to transfer the modification requests to them with a parameterable execution date. It additionally implements an audit function to check that the data is consistent throughout the network. It communicates with the DBNM1 module 28 through an internal session conforming to the X.215 protocol which implements the normal session interface but not the low layers.

The DBNM3 module 36 is executed in each service control point 12, etc in the ATHOS environment to update the tables of the database 7, etc using the RTDMS 6, etc. This module communicates with the DBNM2 module 32 by means of a normal session conforming to the X.215 protocol which implements all the low layers. Additionally, it transmits an event relating to the modification in progress to a service program 5 executed in real time to command action synchronized with a data modification.

To carry out a modification in the tables of the database 7 managed by the RTDMS 6 the DBNM3 module analyzes each instruction in the SQL language, looking for:

the name of the operation;

the name of the table;

the name of all the columns of the table to which the modification relates;

the values of these columns, received as ASCII codes, to translate them into CHILL codes;

the access key, in a WHERE clause.

The DBNM3 module also carries out a number of table conversions because, for reasons connected with performance, the layout of the tables in each real time database management system can differ slightly from that of the relational database management system tables. For example, multiple columns of a relational database management system may be combined into a single column in a table of each real time database management system 6, etc.

The data modifications requested in each update message are carried out in the database 7 after which an acknowledge is sent by the DBNM3 module to the DBNM2 module in the service control point 11 if the modifications have been executed without error. If an event accompanied the update message the DBNM3 module transmits it to the real time service program 5.

FIG. 4 shows a more a detailed functional block diagram of the DBNM2 module 32. It comprises: a module 40 for analyzing the date accompanying a modification request; a deferred modification log management service module 41; a data distribution module 42; an audit module 43; and a module 44 managing modifications distributed between the service control points.

The module 40 analyzes the date set for execution of the modifications, as the service control point databases are not necessarily updated immediately. The date is a parameter checked by the application processes. When the date represents deferred execution the modifications are processed by the module 41. When the execution date arrives, the module 41 transfers the modification request to the module 42.

The log file 34 contains a list of modification requests for execution, classified by due date. It is filled by the module 41 each time that a date indicates deferred execution. The log file 34 is emptied by the module 44 which is activated each time a modification request must be transmitted to a service control point by a time management system of the ATHOS operating system. When it has processed all the requests for a given date, the module 44 indicates to the time management system the next date at which it must be activated.

The function of the module 42 is to determine a list of service control points to which data modifications must be relayed, on the basis of the data 35 describing the breakdown of services in the service control point.

The data is distributed in the manner now to be described. For each service control point the data 35 contains a list of the services provided by each service control point. For each service the data 35 contains a list of the names of tables containing the data by means of which this service is provided. For each table name the data 35 contains a list of the names of the tables to be updated if a service is provided on a traffic sharing basis between different service control points. If a service is provided on a resource sharing basis, the data 35 further includes criteria for distribution on the primary access key; for example, all numbers below a given number are managed in one service control point and all higher numbers are managed in another service control point.

The function of the module 44 is to execute modification requests in all the service control points in which a full or partial copy of the table to be modified exists. If a modification must be made in more than one service control point the module 44 does not require the data in all the service control points to be modified simultaneously. If, for example, a service control point is temporarily accessible, the modifications are carried out in all the other service control points, given that the projected unavailability of the links and the nodes of the intelligent network conforms to specific telephone standards.

The mutual consistency of the various databases is therefore weak but overall consistency is guaranteed by the log files 33 and 34. The module 44 assigns a reference to each operation which modifies data in all the service control points to which an update message relates.

It sends a modification message to all the service control points concerned. It stores the operation reference in the log file 33. The operation remains stored in the log file 33 until the log file 34 has recorded an acknowledgement from each of the service control points to which the update in progress relates.

The audit module 43 verifies the consistency of data throughout the network. It requests reading of each table in the reference database 4, in blocks of a fixed number of lines, and builds requests to read the same lines in all the service control points containing a copy of them. It compares the two, allowing for the content of the log files 33 and 34. If any inconsistency is detected, the module 43 advises the service control point operator and reestablishes consistency only at the explicit request of the operator.

The scope of the invention is not limited to the embodiment described above. In particular, the method in accordance with the invention can be implemented in environments representing known operating systems other than the ANIX and ATHOS systems.

There is claimed:

1. A method of managing a network of databases comprising (i) a relational database which constitutes a reference database having an associated database management system and being accessible with a first access time, and (ii) at least one additional database having a respective database management system and being accessible with a second access time faster than said first access time, at least some of the data of the relational database being duplicated in the at least one additional database, wherein to enable an application process to modify data in all of the database network, the method, which ensures that a data modification request is executed throughout the network, comprises:

sending said data modification request, in a single language for modifying all said databases, from the application process to a pool of server processes of said database network management system;

assigning a tag to each modification request;

storing the tag of the request in a file;

assigning a server process to said request for the duration of its processing;

sending the modification request in said language from the server process pool to said database management system of said relational database, accessing said relational database in accordance with said first access time and executing said request;

determining a set of at least one of said additional databases to which the modification request relates;

transferring said request from said database network management system to said at least one additional database in a form which is different from said language and is compatible with the management system of each said at least one additional database;

accessing said additional databases in accordance with said second access time and executing the modification request and sending a signal reporting that the modification request has been executed in each of said at least one additional database;

storing in a file an identifier of each additional database which reported that said modification request has been executed in each of said at least one additional database;

concluding that execution of said modification request is complete in the database network when all the databases concerned have reported that said modification request has been executed; and concluding that the execution is not complete in all the database network when at least one database concerned has not reported that said modification request has been executed.

2. A method according to claim 1, further comprising transferring from said application process to said server process a signal for deferring the execution of a data modification request in each of said at least one additional database.

3. A method according to claim 1, wherein, to guarantee the consistency of data in all of the network, it further comprises verifying that the contents of the reference database matches the content of said at least one additional database, and in supplying a message to an operator when an inconsistency is detected.

* * * * *